(No Model.)
J. W. HYATT.
APPARATUS FOR PURIFYING WATER.
No. 350,679. Patented Oct. 12, 1886.
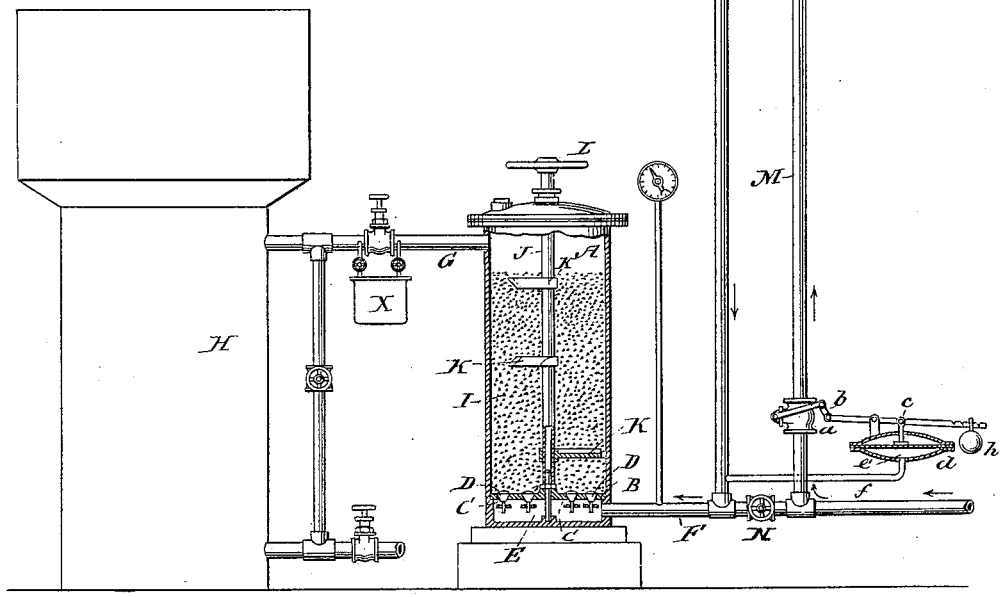
WITNESSES:
Edward Wolff
George Cook
INVENTOR
John W. Hyatt

UNITED STATES PATENT OFFICE.

JOHN W. HYATT, OF NEWARK, NEW JERSEY.

APPARATUS FOR PURIFYING WATER.

SPECIFICATION forming part of Letters Patent No. 350,679, dated October 12, 1886.

Application filed August 24, 1885. Serial No. 175,187. (No model.)

*To all whom it may concern:*

Be it known that I, JOHN W. HYATT, a citizen of the United States, and a resident of Newark, in the county of Essex and State of New Jersey, have invented certain new and useful Improvements in the Art of Purifying Water, of which the following is a specification.

The invention relates to improvements in the art of purifying water; and it consists in novel apparatus, embracing, first, a vessel containing a bed of comminuted metallic iron, either alone or intermixed with ground emery, sand, or other inert substance, the bed being arranged upon a bottom containing a series of openings supplied with automatically-operating check-valves, a supply-pipe leading to the under surface of said bottom, and an escape-pipe at the upper portion of the vessel passing to a filter; second, the vessel, bed of metallic iron, and the supply and escape pipes above described, in connection with means for delivering air into the supply-pipe, whereby the air and water will be combined and pass into and through the said bed together; third, the vessel, bed, and supply and delivery pipes above mentioned, combined with an agitator located within the bed; and, fourth, in certain details of construction and arrangement hereinafter described.

The invention will be more particularly understood from the description hereinafter presented, reference being had to the accompanying drawing, of which the figure is a central vertical section of same illustrated in connection with a filter of the class shown and described in certain Letters Patent of the United States granted to me on the 14th day of July, 1885, and numbered 322,103.

In the drawing, A denotes a closed vessel of suitable form, size, and construction, in the lower portion of which is arranged a false bottom, B, containing apertures C, supplied with automatic upwardly-acting check-valves D.

Between the false bottom B and the bottom proper of the vessel is formed a space, E, into which the supply-pipe F passes. The escape-pipe G extends from the upper portion of the vessel A to a filter, H, or to some other receptacle, according to the purposes to which the water is to be applied.

Within the vessel A, and upon the false bottom B, is placed a bed, I, consisting of iron borings or granular or comminuted metallic iron, either alone or intermixed with sand, ground emery, or other suitable inert material. The bed I will about two-thirds fill the vessel A, and within it is provided a vertical shaft, J, having radial agitating arms or blades K, and being supplied upon its end with a hand-wheel, L. It will not be necessary in all cases to employ the agitating shaft J and blades K; but they may prove in some instances desirable, as hereinafter specified.

Upon the supply-pipe F is applied a stand-pipe or aerating device, M, consisting of two branches connected together at their upper end, and being secured at their lower end to the supply-pipe F, into which they open, as indicated in the figure. Between the lower ends of the branches of the pipe M the supply-pipe F is provided with a valve, N, whereby the water, instead of passing directly into the vessel A, may, when desired or found necessary, be turned upward through one of said branches, and allowed to return to the pipe F through the other branch, after which it passes into the vessel A. Into the upper end of the stand-pipe M leads the upper portion of the air-pipe O.

It may be essential under some conditions to regulate the pressure of the water in the aerating apparatus in order to insure the proper amount of air being drawn through the pipe O; and to this end I have provided the inlet branch of the pipe M with a wing-valve, $a$, or other suitable valve, and connected its axis by a hinged arm, $b$, to the upper end of the diaphragm-stem $c$, which passes upward through the regulator-casing $d$, of well-known construction. The casing $d$ below the diaphragm $e$ is in communication with the outlet branch of the aerating-pipe M through a pipe, $f$. The arm $b$ beyond the diaphragm-stem $c$ will have a graduated scale and carry the weight or counterpoise $h$, which will be set upon the scale at a point indicating the number of pounds pressure it is desired the water shall maintain in the outlet branch of the stand-pipe M. If at any time the pressure of water in the pipe M should be excessive, the water in the pipe $f$ and lower part of the casing $d$ would press upward against the diaphragm $e$, thereby elevating the stem $c$ and arm b, and partially or wholly closing the valve a, thus cutting off a part or the whole of the water-supply.

The diaphragm and connecting devices place the aerating apparatus wholly within the control of the attendant, and is automatic in its operation after having been once adjusted.

In the upper portion of the air-pipe O is supplied a check-valve, m, which will at all times permit the passage of air into the pipe M, but which will effectually prevent the water from escaping through the pipe O.

During the operation of the invention the water moves through the pipe F directly into the space E, or first upward through one branch of the stand-pipe M and downward through the other branch, whence it again re-enters the pipe F and passes into the space E, and thence upward through the openings C into the bed I and away through the pipe G. At the same time the flow of water through the pipe M automatically draws in air through the pipe O, which thoroughly intermingles and combines with the water, and effectually aerates it prior to its entrance into the vessel A. In order to accelerate the aeration of the water, an agitator or series of Sprengel air-pumps, n, is provided in the outlet branch of the pipe M, which prevents an unbroken flow of the air and water, and thus aids in combining and commingling the same. The device n is shown in my application for Letters Patent filed February 26, 1885, hereinafter referred to. The effect of the metallic iron on the water is to coagulate the impurities therein, while the air serves, first, to increase the capacity of the water to dissolve metallic iron, and, second, to precipitate the iron in solution and prevent, by its further oxidation within the filter-bed, the escape of the same with the water. The vessel A, when used in connection with a filter of the kind shown, will be about one-third of the diameter of the filter, or about one-tenth of the cubical contents thereof, and the pipes M O will be of suitable size, according to the volume of the water to be filtered within a given time. In a commercial point of view the size of the particles of iron in the bed I is of importance, and I have found that the best results may be attained when the grains are of about a size capable of closely passing through a sieve of about two hundred and fifty-six to three hundred and twenty-four meshes to the square inch, since under these conditions the water may pass rapidly through the bed without prejudice to a thorough coagulation of the impurities, and without danger of the substance of the bed being carried off. The due coagulation of the impurities would be effected should the bed consist wholly of iron-borings; but when sand, ground emery, or similar material is intermixed with the iron the latter will not mat or rust together, which would be its tendency were the sand or equivalent substance omitted.

If at any time during the operation of the invention it should be discovered that the agitator-shaft J was very difficult to rotate, it would indicate that the bed was becoming clogged or solidified and required agitation, or that the size of the particles of the bed was too large in proportion to the size of the vessel A and the amount of water passing through it.

The operation of the stand-pipe or aerating device M is substantially similar to that of the stand-pipe shown and described in my application for Letters Patent of the United States filed on the 26th day of February, 1885, in which application is fully set forth the effect on the water of combining air therewith.

The filter used in connection with the vessel A may be varied in construction as may be desired; but I prefer to use the one shown in the drawings and heretofore patented to me, as aforesaid.

It should be noted that the bed of material in the vessel A is not necessarily a filter-bed, but a means of coagulating the impurities before the water enters the filter, or of charging the water with a solution of protoxide of iron, which becomes further oxidized in its passage through the filter, forming an insoluble oxide of iron, which precipitates with the impurities within the filter-bed. The capacity of the water for dissolving the metallic iron and the further oxidation of the iron solution is greatly augmented by its aeration, as above described.

If it should be desired to eliminate the impurities in the water by the well-known settling process, the pipe G, leading from the vessel A, will be connected with a settling reservoir or tank, instead of the filter H. This will not, however, involve any change in the vessel A or the aerating device.

It will not be necessary in all instances, whether the filter or settling-tank is employed, to make use of the aerating device, since the impurities in some waters may be effectually coagulated by passing through the vessel A alone; but where the water is particularly impure or contains a large amount of vegetable matter I recommend that the aerating apparatus be employed.

The protoxide of iron may be removed in the filter-bed without aeration by the employment of comminuted carbonate of lime, the same being used wholly or in part as a filter-bed, as described and claimed in my Patent No. 293,882, dated February 19, 1884, or within an injector or vessel, X, as described in Letters Patent No. 293,749, issued to me February 19, 1884.

It is not to be understood that I claim, broadly, herein the introduction of iron as a coagulant into the volume of water passing to a filter, since the same is, in a broad sense, covered by Letters Patent No. 293,740, issued to Isaiah Smith Hyatt, February 19, 1884, and No. 293,749, issued to myself February 19, 1884; nor do I claim herein a filter-bed consisting of comminuted metallic iron and an inert substance, the same being broadly covered in Letters Patent No. 293,741, issued to Isaiah Smith Hyatt, February 19, 1884; nor do I claim, broadly, the introduction into a filter of air and water under pressure, this being fully described and claimed in Letters Patent to Daniel C. Otis, No. 229,744, dated July 6, 1880, all of which patents are under the control of the Newark Filtering Company, of Newark, New Jersey.

What I claim as my invention, and desire to secure by Letters Patent, is—

1. For use in purifying water, a vessel inclosing a bed of comminuted metallic iron and ground emery or other inert substance, and constructed with a false bottom, on which the bed rests, said bottom being provided with a series of protected inlets and a water-supply pipe leading into the vessel between the bottoms, substantially as set forth.

2. For use in purifying water, a vessel having a supply and delivery, a false bottom above the supply containing a series of inlets, a bed upon the false bottom composed, essentially, of comminuted metallic iron, and an agitator located within the bed, substantially as set forth.

3. A vessel having a supply and delivery and containing a bed the essential element of which is comminuted metallic iron, combined with an aerating device in connection with the supply, substantially as set forth.

4. A vessel having inlet and outlet pipes and inclosing a bed the essential element of which is comminuted metallic iron, combined with a filter and with an aerating device, substantially as set forth.

5. A vessel having an inlet and outlet and inclosing a bed the essential element of which is comminuted metallic iron, combined with a stand-pipe connected with the inlet and an air-pipe opening into the stand-pipe, whereby the water is automatically charged with air while passing through said pipe, substantially as set forth.

6. A vessel having an inlet and an outlet and inclosing a bed the essential element of which is comminuted metallic iron, combined with an aerating device and a water-pressure regulator, substantially as set forth.

7. A vessel having an inlet and an outlet and inclosing a bed the essential element of which is comminuted metallic iron, combined with a filter, an aerating device, and a water-pressure regulator, substantially as set forth.

8. The vessel containing a bed of comminuted or granular material and having a supply and delivery, combined with the stand-pipe, the inlet branch of which contains a valve connected with a diaphragm-stem, and the outlet branch is in communication with the lower side of the diaphragm, substantially as set forth.

9. A vessel having an inlet and an outlet and inclosing a bed, the essential element of which is comminuted metallic iron, combined with the aerating device, an agitator within said device, and a water-regulating valve, substantially as set forth.

Signed at New York, in the county of New York and State of New York, this 20th day of August, A. D. 1885.

JOHN W. HYATT.

Witnesses:
GEORGE COOK,
CHAS. C. GILL.